R. SCHAAP.
Combined Shovel and Ash Sifter.
No. 46,946.
Patented March 21, 1865.
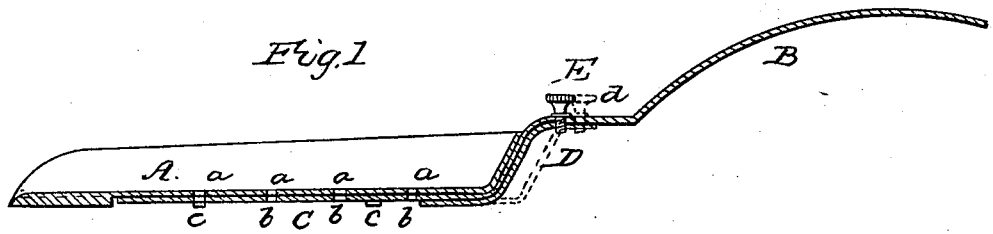
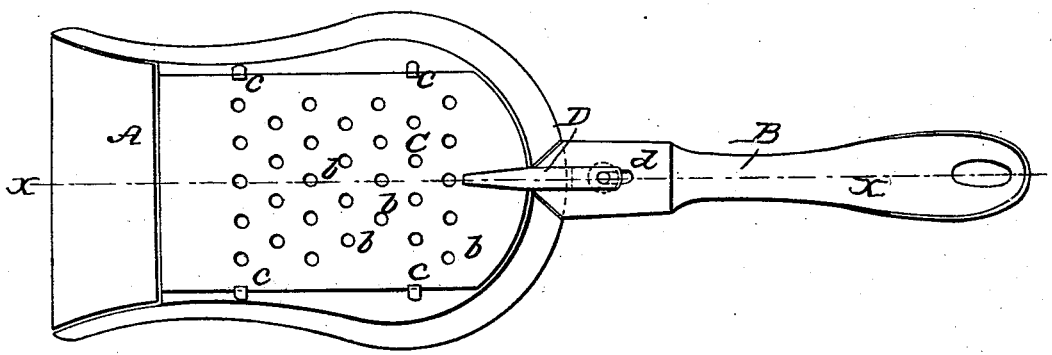
Witnesses
Wm Oreurn
C L Topliff
Inventor
Richard Schaap
per Munn & Co
attorneys

UNITED STATES PATENT OFFICE.

RICHARD SCHAAP, JR., OF BROOKLYN, NEW YORK.

COMBINED SHOVEL AND ASH-SIFTER.

Specification forming part of Letters Patent No. 46,916, dated March 21, 1865.

*To all whom it may concern:*

Be it known that I, RICHARD SCHAAP, Jr., of Brooklyn, in the county of Kings and State of New York, have invented a new and Improved Combination of an Ash-Sifter and Shovel; and I do hereby declare that the following is a full, clear, and exact description thereof, which will enable others skilled in the art to make and use the same, reference being had to the accompanying drawings, forming part of this specification, in which—

Figure 1 is a longitudinal section of my invention taken in the line $x\ x$, Fig. 2; Fig. 2, an inverted plan or bottom view of the same.

Similar letters of reference indicate like parts.

The object of this invention is to combine with an ordinary fire-shovel, such as is used for putting coal on a fire, taking up ashes, &c., an ash-sifter, and having the implement devised, constructed, and arranged in such a manner that it may by a very simple adjustment or manipulation be made to serve as a shovel or sifter, as may be required, equally as well as if made for either purpose specially, thereby combining in the most perfect manner and at an inappreciable cost the two implements specified.

A represents the blade, and B the handle, of an ordinary stove or fire-shovel. These parts may be of the usual shape or form, and may not differ essentially from the ordinary ones in use, with the exception of perforations $a$ in its bottom or blade A, which are of such a size and at such a distance apart to form a sieve to admit ashes to pass through and retain the cinders on the blade.

C represents a sliding plate, which is perforated with holes $b$, corresponding in size and position to those in the blade of the shovel. This sliding plate C is fitted between lips $c$ at the bottom or under side of the shovel, which serve as guides, and is allowed to slide freely between them, said plate having a tang, D, attached to it, which extends up underneath the lower part of the handle, and has a set-screw, E, passing into it, said screw passing through an oblong slot, $d$, in the handle, to admit of a certain degree of adjustment of the sliding plate, so that its holes may be made to register with those in the blade of the shovel or the sliding plate be made to close the holes in the blade. Under the latter adjustment of the sliding plate the device is used as a shovel, as the holes in the blade A are all closed. When, however, the sliding plate is adjusted so that its holes will register with those of the blade A, a sifter is obtained, which will answer equally as well as if the device were made specially for that purpose.

I claim as new and desire to secure by Letters Patent—

A combined shovel and ash-sifter composed of a shovel-blade perforated and provided with a perforated sliding seat, substantially as herein set forth.

RICHARD SCHAAP, JR.

Witnesses:
M. M. LIVINGSTON,
C. L. TOPLIFF.